INVENTOR
NICOLAAS WARMOLTZ
BY
AGENT

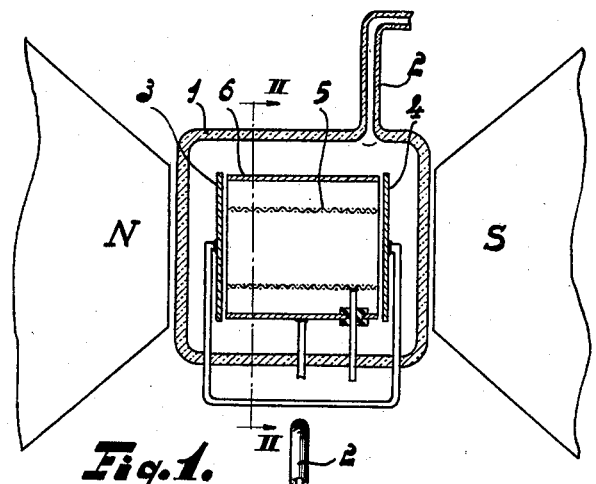
Fig. 1.
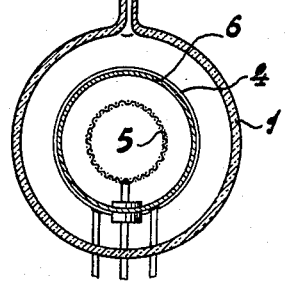
Fig. 2.
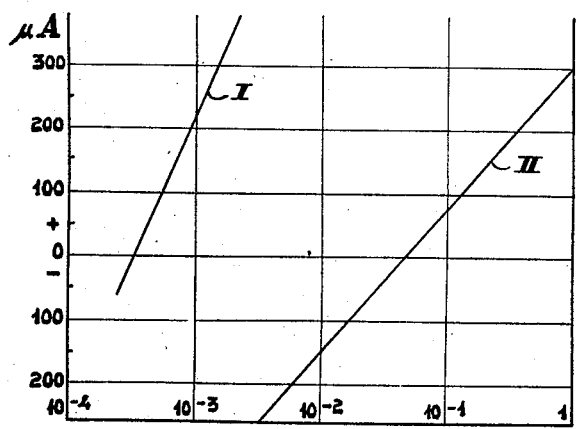
Fig. 3.
INVENTOR
NICOLAAS WARMOLTZ
BY 
AGENT Aug. 11, 1959 N. WARMOLTZ 2,899,605
GLOW DISCHARGE APPARATUS FOR MEASURING LOW GAS PRESSURES
Filed June 28, 1955 2 Sheets-Sheet 2

United States Patent Office 2,899,605
Patented Aug. 11, 1959

2,899,605

GLOW DISCHARGE APPARATUS FOR MEASURING LOW GAS PRESSURES

Nicolaas Warmoltz, Eindhoven, Netherlands, assignor, by mesne assignments, to North American Philips Company, Inc., New York, N.Y., a corporation of Delaware Application June 28, 1955, Serial No. 518,551

Claims priority, application Netherlands July 7, 1954

7 Claims. (Cl. 315—108)

The invention relates to a pressure measuring device or apparatus of the glow discharge type for measuring low gas pressures prevailing in a space connected to said apparatus. In such apparatus, a glow discharge path is produced between a cathode comprising two opposed flat plates of equal size and an anode consisting of a ring or cylinder which surrounds the space between the two cathode parts, provision being made of a magnetic field whose concentrated lines of force intersects the two cathode parts but not the anode.

The above-described glow discharge apparatus are widely used due to their simple construction, facilitiy in use and continuous indication even of condensable vapours. In contradistinction to many other manometers their operation is not interfered with by a magnetic field but on the contrary is based on the presence of such a field. The value of this magnetic field is not particularly critical. Thus, such a glow discharge apparatus may, for example, be used in the stray field of the magnet of a cyclotron so that the pressure can be measured in closest proximity to the vacuum chamber.

The known manometer, however, suffers from the limitation that the pressure range in which a dependable indication is obtainable has a comparatively low upper limit. With increase in pressure another instrument must be used, which frequently does not give a continuous indication or which is sensitive to the influence of magnetic fields.

In a glow discharge apparatus for measuring low gas pressures in a space communicating with the apparatus, in which the cathode consists of two opposed flat plates of equal size and the anode consists of a ring or cylinder surrounding the space between the two cathode parts, provision being made of a magnetic field of which a concentration of lines of force intersects the cathode parts but not the anode, according to the invention the anode consists of a wide-mesh grid and is surrounded by a conductive cylinder one and a half to two times as great in diameter to which a positive voltage is applied which is lower than that of the anode and preferably is one quarter or one half thereof, the current to this outermost electrode acting as a measure of the gas pressure. The arrangement in accordance with the invention enables a dependable indication to be obtained in the pressure range of from approximately 0.001 mm. to 1 mm. In order to measure lower pressures the outermost electrode can be connected to the anode as in the known arrangement.

The invention will now be described more fully with reference to the accompanying diagrammatic drawing, in which:

Figures 1 and 2 show cross-sections of a glow discharge apparatus in accordance with the invention taken so as to be parallel to the axis and at right angles to the axis respectively;

Fig. 3 shows the variation of the current flowing to the said outer electrode as a function of the pressure;

Fig. 4 shows the circuit arrangement with which Fig. 3 is obtained.

Figure 4:
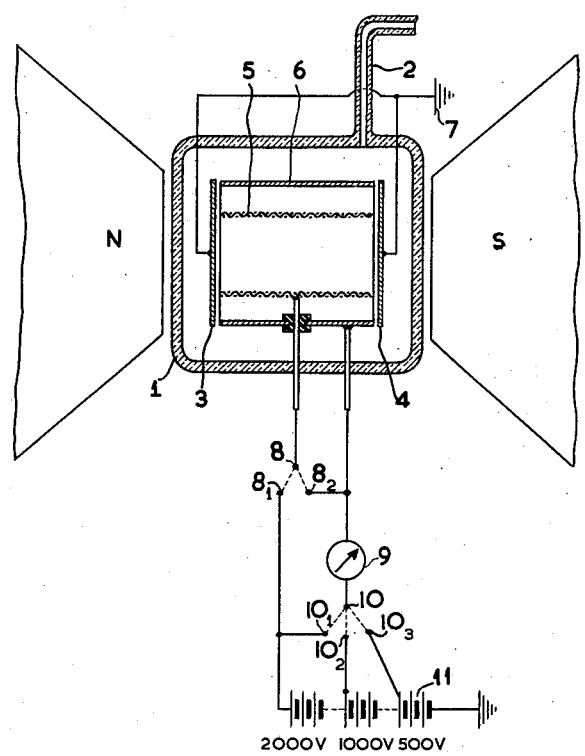

In Figures 1 and 2 reference numeral 1 designates the glass wall of the envelope of the glow discharge apparatus which by means of a glass tube 2 may be made to communicate with a space the pressure in which must be measured. The cathode of the glow discharge apparatus consists of two circular plates 3 and 4, each 30 mms. in diameter, which are interconnected outside the glass envelope. The anode consists of a cylindrical grid 5 which is 25 mms. long and 20 mms. in diameter with meshes of 2 x 2 mms. each. The current supply wire to this perforated anode 5 is insulated from a cylindrical electrode 6 having the same length as the anode and being 30 mms. in diameter. As shown in Figs. 1 and 2, the mesh anode 5 and cylindrical outer electrode 6 are coaxial with one another and with an imaginary line joining approximately the centers of the two cathode plates, and also surround the space between the cathode plates 3 and 4. Two pole pieces of a magnet system are designated N and S and set up a magnetic field of 350 Gauss at the point of the glow discharge path between the electrodes. Because of the arrangement of the two cylindrical electrodes 5 and 6 relative to the cathodes 3 and 4, the main lines of force between the pole pieces intersect the cathodes but not the anodes.

In Figure 3, the curves I and II show the variation of the current flowing to the outer electrode 6, when the anode 5 voltage is 2000 volts and the voltage of the said outer electrode 6 is 500 and 1000 volts positive with respect to the cathode, respectively. The vertical axis is scaled in microamperes and the horizontal axis is scaled logarithmically in mms. of new mercury pressure. The curves apply to the pressure measurement of argon or air. At low pressures of approximately $10^{-4}$ mms. for curve I and $10^{-2}$ mms. for curve II this current is an electron current; at higher pressures it is a positive ion current and consequently the current in this high pressure range is shown positive, although a direct current meter has a negative deflection. Thus, by once changing over the voltage of the outer electrode 6, the pressure can be measured in the range of from 2 x $10^{-4}$ mms. to approximately 1 mm., while for lower pressures the cylinder 6 and the perforated anode 5 both have a 2000 volts potential applied to them.

In Fig. 4 the glow discharge tube is incorporated into a measuring circuit by connecting the cathode plates 3 and 4 to ground as indicated at 7. Anode 5 is connected through a switch 8 in position $8_2$ to the positive end of a 2000 v. source 11, or in position $8_2$ to the cylindrical electrode 6. In the lead to electrode 6 there is incorporated a $\mu$a. meter 9. Switch 10 has three positions $10_1$, $10_2$, $10_3$ connecting, respectively, electrode 6 to 2000 v., 1000 v., or 500 v. The negative terminal of source 11 has been grounded. Curve II of Figure 3 is obtained with position $10_2$ of switch 10. Curve I is obtained with position $10_3$ of switch 10, switch 8 being in both cases in position $8_1$. If switch 8 is brought into position $8_2$ and 10 into position $10_1$, the known arrangement is obtained for measuring the lower pressure range.

What is claimed is:

1. In a pressure measuring device adapted to receive a gas whose pressure is to be measured, a pair of spaced, opposed, cathode electrodes, a hollow, perforated, anode electrode having a central axis extending parallel to an imaginary line joining the center of both cathode electrodes and surrounding a portion of the space between the spaced, cathode electrodes, a hollow, conductive, outer electrode coaxial with and surrounding the perforated, anode electrode, means for establishing a magnetic field having lines of force extending substantially between the cathode electrodes and generally parallel to the said imaginary line, means coupled to said anode and outer electrodes for applying thereto positive potentials relative to the cathode electrodes at which a discharge is established between the electrodes, and means for selectively coupling to one of the anode or outer electrodes for measuring the discharge current collected thereby and thus obtaining an indication of the pressure of the gas received by the device.

2. A device as set forth in claim 1 wherein the current-measuring means are coupled to the outer electrode.

3. A device as set forth in claim 2 wherein switching means are provided for selectively applying the same and different potentials to the anode and outer electrodes.

4. A pressure-measuring device of the glow discharge type comprising an enclosure containing means by which a gas, whose pressure is to be measured, may be introduced, a pair of opposed, spaced, disc-like, cathode electrodes, a hollow, annular, perforated, anode electrode having a given diameter and a central axis extending parallel to an imaginary line joining the center of both cathode electrodes and surrounding the space between the cathode electrodes, a conductive, cylindrical, outer electrode having a diameter between about three-halves and twice greater than said given diameter surrounding and substantially coaxial with said perforated anode, means for establishing a magnetic field having lines of force extending substantially coaxially with said anode and outer electrodes, means for applying said perforated anode electrode a positive potential relative to said cathodes, means for applying to said outer electrode and relative to said cathodes a positive potential having a value lower than that applied to said perforated anode, and means coupled to said outer electrode for measuring the discharge current collected thereby and thus providing an indication of the pressure of said gas.

5. A device as set forth in claim 4 wherein the cathode electrodes are the same size, the perforated anode is cylindrical and is constituted of a wide-meshed grid material, and the potential applied to the outer electrode is between about ¼ and ½ that applied to the perforated anode.

6. In a pressure measuring device adapted to receive a gas whose pressure is to be measured and comprising a pair of spaced, opposed, interconnected, cathode electrodes, a first, hollow, anode electrode having a central axis extending generally parallel to an imaginary line joining the center of both cathode electrodes and surrounding a portion of the space between the said cathode electrodes, means establishing a magnetic field in the said space with lines of force extending between the cathode electrodes, and means for biasing the anode electrode at a positive potential relative to the cathode electrodes, the improvement comprising a second, hollow, perforated, grid-like, anode electrode mounted coaxial with and within the first anode electrode, and means for biasing said second anode at a positive potential relative to the cathode electrodes, said second and first anodes being insulated from one another so that different potentials may be applied thereto, thereby to extend the pressure-measuring range of the device.

7. A pressure measuring device as set forth in claim 6, wherein the second anode electrode comprises a wide-meshed grid, and the potential applied to said first anode is less than that applied to said second anode.

References Cited in the file of this patent

UNITED STATES PATENTS

| 1,465,394 | Houskeeper | Aug. 21, 1923 |

FOREIGN PATENTS

| 673,424 | Great Britain | June 4, 1952 |

UNITED STATES PATENT OFFICE
Certificate of Correction

Patent No. 2,899,605                                                          August 11, 1959

Nicolaas Warmoltz

It is hereby certified that error appears in the printed specification of the above numbered patent requiring correction and that the said Letters Patent should read as corrected below.

Column 2, line 33, for "of new mercury" read —of mercury—; line 49, for "position $8_2$" read —position $8_1$—; line 52, for "a $\mu$a." read —a $\mu$A—.

Signed and sealed this 16th day of February 1960.

[SEAL]

Attest:
KARL H. AXLINE,                                                      ROBERT C. WATSON,
Attesting Officer.                                                     Commissioner of Patents.